(12) United States Patent
Jeong

(10) Patent No.: US 6,483,510 B1
(45) Date of Patent: Nov. 19, 2002

(54) INTEGRATED GRAPHIC AND CHARACTER MIXING CIRCUIT FOR DRIVING AN LCD DISPLAY

(75) Inventor: Chan-Young Jeong, Seongnam (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/311,327

(22) Filed: May 13, 1999

(30) Foreign Application Priority Data

Sep. 18, 1998 (KR) .............................................. 98-38690

(51) Int. Cl.[7] .............................................. G06T 11/00
(52) U.S. Cl. ........................ 345/467; 345/636; 345/531; 345/551
(58) Field of Search ................................. 345/629, 636, 345/467, 471, 472.3, 536, 87, 531, 551

(56) References Cited

U.S. PATENT DOCUMENTS 4,684,935 A * 8/1987 Fujisaku et al. ............ 345/536
4,775,891 A * 10/1988 Aoki et al. .................... 345/87

* cited by examiner

Primary Examiner—Michael Razavi
Assistant Examiner—Scott Wallace
(74) Attorney, Agent, or Firm—Mills & Onello, LLP

(57) ABSTRACT

An integrated graphic and character combining circuit for driving a display device, for example an LCD panel, allows for a configuration by which an external ROM is not necessary, reduces processing burden on the data-supplying processor, and provides a system wherein both graphic images and complete character fonts can be combined and simultaneously displayed on an LCD panel. The circuit includes a character font ROM, a character display data RAM, a graphic image data RAM, a property register, a character/graphic mixed display control circuit, an interface circuit, and a common/segment LCD driver. The character font ROM stores font data pertaining to complete characters. The character display data RAM stores addresses corresponding to the font data stored in the character font ROM. The graphic image data RAM stores graphic image data. The property register stores selection information pertaining to the graphic and character data. The character/graphic mixed display control circuit receives the font data from the character font ROM and graphic image data from the graphic image data RAM, and selects and outputs final data to be displayed on an LCD panel, in response to the output of the property register.

9 Claims, 3 Drawing Sheets

INTEGRATED GRAPHIC AND CHARACTER MIXING CIRCUIT FOR DRIVING AN LCD DISPLAY

BACKGROUND OF THE INVENTION

1. Field of the Invention

The present invention relates to an integrated circuit (IC) for driving a display device, and more particularly, to an integrated graphic- and character-mixing circuit for driving a liquid crystal display (LCD) panel.

2. Description of the Related Art

Display devices have been widely applied to contemporary systems as electro-optical elements for converting electrical signals into visual images. LCD devices are an example of widely-used display devices. They can be of a graphic-type for individually displaying each pixel of an LCD panel in bit units, or of a character-type for displaying complete characters on the LCD panel as a character set. A driving circuit is tailored to serve each type of LCD device.

Referring to FIG. 1, a conventional graphic-type LCD driving circuit includes a microprocessor unit (MPU) interface circuit 101, a graphic data RAM 103, and a common/segment LCD driver 105.

The MPU interface circuit 101 is connected to an external microprocessor unit (MPU), or microcontroller unit (MCU), and is configured to transmit and receive data. The memory size of the graphic data RAM 103 corresponds to the number of pixels on the LCD screen. Data is transmitted to the graphic data RAM from the MPU via the MPU interface circuit 101. The common/segment LCD driver 105 outputs a common level signal (COM) and a segment level signal (SEG) in response to data output by the graphic data RAM 103. The COM and SEG signals in turn drive the LCD panel.

Data transmitted from the MPU to the graphic-type driving circuit generally includes a large amount of image data to be displayed on the LCD screen. It is therefore stored in an external ROM interfaced with the MPU. When the MPU reads data from the external ROM and writes the data into the graphic-type driving circuit, the circuit converts binary data of "1" and "0" into appropriate COM and SEG signals, suitable for driving the graphic LCD panel.

However, in a system employing a conventional graphic-type LCD driving circuit, when only one MPU is employed, that single MPU must read data from the external ROM and write the data into the graphic-type driving circuit each time the LCD panel is updated. Thus, the MPU is overburdened. Furthermore, the external ROM increases system costs.

Referring to FIG. 2, a conventional character-type LCD driving circuit includes an MPU interface circuit 201, a character display data RAM 203, a character font ROM 205, and a common/segment LCD driver 207.

The MPU interface circuit 201 is connected to an external MPU (or MCU) and is configured to transmit and receive data. The character font ROM 205 stores font data of a set of complete characters, for example a set of Korean characters, Chinese characters, or English alphabet characters, etc. The characters are related in size so as to occupy a specified number of pixels, for example 5×8 or 16×16 pixels. The character display data RAM 203 stores addresses corresponding to font data stored in the character font ROM 205. The addresses are transmitted from the external MPU via the MPU interface circuit 201. The common/segment LCD driver 207 receives font data from the character font ROM 205 and outputs a common signal level (COM) and a segment signal level (SEG). In this manner, complete characters are displayed on an LCD panel.

When the external MPU writes the address of a character font for display on the LCD unit into the character display data RAM 203, font data corresponding to the address is output by the character font ROM 205. Thus, the common/segment LCD driver 207 displays the font data as a complete character on the LCD panel.

As described above, the conventional character-type driving circuit includes a character font ROM 205 to reduce processing burden on the MPU. However, this configuration is limited in that only characters stored in the character font ROM can be displayed, to the exclusion of graphics.

The conventional graphic-type LCD driving circuits and character-type LCD driving circuits each exhibit the limitations described above, and are therefore not amenable to use with a number of contemporary systems such as a cellular telephone systems, which require concurrent display of not only graphics in the form of pictures and image data, but also complete characters, on an LCD panel.

SUMMARY OF THE INVENTION

To address the above limitations, it is an objective of the present invention to provide an integrated graphic and character mixing circuit for driving a display device, for example an LCD display, by which an external ROM is unnecessary, wherein less burden is imposed on the associated MPU, and wherein both graphic images and complete characters can be combined and concurrently displayed on an LCD panel.

Accordingly, to achieve the above objective, the present invention provides an integrated display driving circuit, for example an LCD panel driving circuit, comprising a character font ROM, a character display data RAM, a graphic image data RAM, a property register, a character/graphic mixed display control circuit, an interface circuit, and a common/segment LCD driver.

The character font ROM stores font data related to complete characters. The character display data RAM stores addresses corresponding to the font data stored in the character font ROM. The graphic image data RAM stores graphic image data. The property register stores selection information related to the graphic and character data. The character/graphic mixed display control circuit receives the font data from the character font ROM and graphic image data from the graphic image data RAM, and selects and outputs final data to be displayed on an LCD panel, in response to the output of the property register. The interface circuit receives the addresses, the graphic image data, and the selection information from an external MPU or MCU and transmits them respectively to the character display data RAM, the graphic image data RAM, and the property register. The common/segment LCD driver generates a common signal level and a segment signal level in response to the output of the character/graphic mixed display control circuit and the common and segment signals are used to drive an LCD unit.

According to a preferred embodiment, the number of bits of the property register is determined by the size of the font stored in the character font ROM, and the LCD panel is segmented according to the maximum size of the font. When the value of each bit of the property register "0", a character stored in the character font ROM is displayed on the LCD panel, and when the value of each bit of the property register is "1", graphic image data stored in the graphic image data RAM is displayed on the LCD panel.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
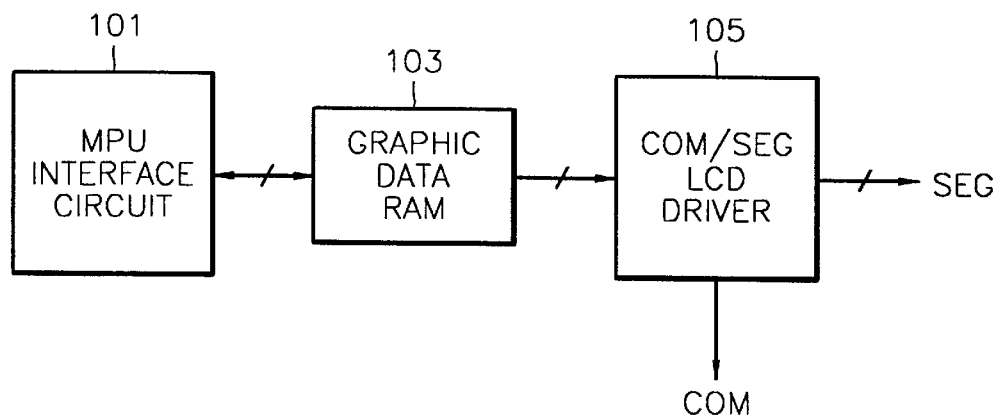
FIG. 1 is a block diagram of a conventional circuit for displaying graphic-type data on an LCD panel.
Figure 2:
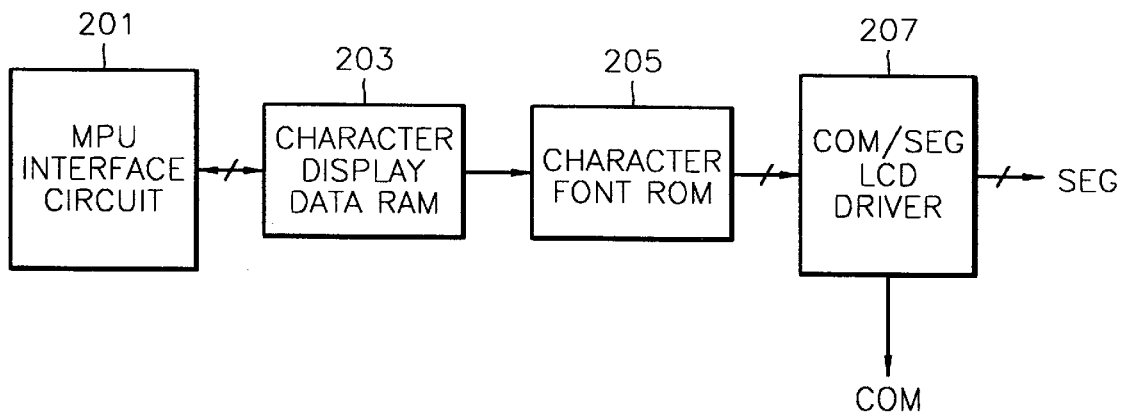
FIG. 2 is a block diagram of a conventional circuit for displaying character-type data on an LCD panel.
Figure 3:
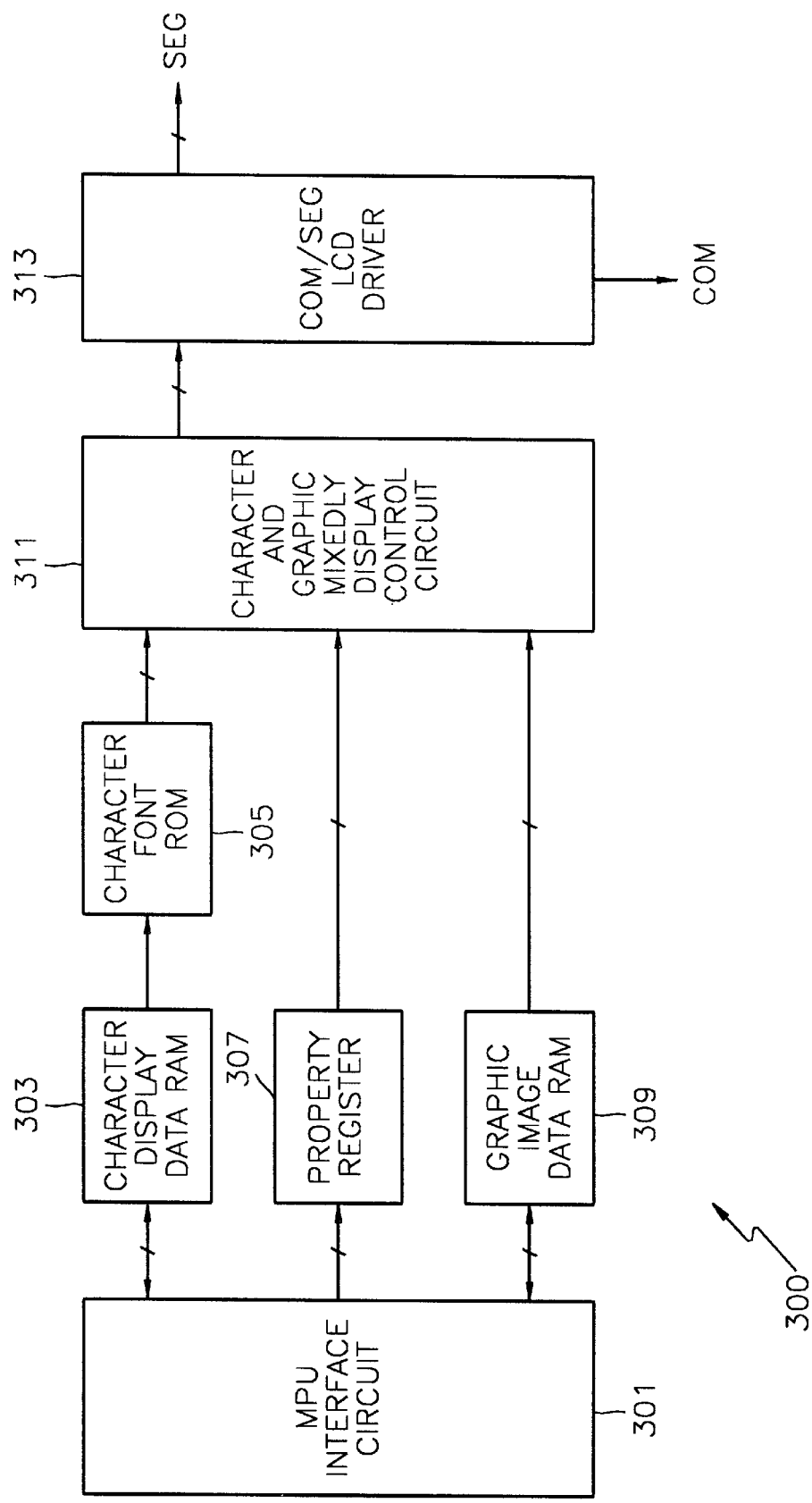
FIG. 3 is a block diagram of an integrated graphic and character mixing circuit for driving an LCD panel according to the present invention.

Referring to FIG. 3, a preferred embodiment of an integrated graphic and character combining circuit for driving a display panel, for example an LCD panel, according to the present invention, includes an MPU interface circuit 301, a character display data RAM 303, a character font ROM 305, a property register 307, a graphic image data RAM 309, a character/graphic mixed display control circuit 311, and a common/segment LCD driver 313.

The character font ROM 305 stores font data of complete characters of the type described above, for example, Korean, Chinese, and English alphabet characters. The character display data RAM 303 stores addresses corresponding to the font data stored in the character font ROM 305. The graphic image data RAM 309 stores graphic image data. The property register 307 stores selection information related to the graphics and characters. The MPU interface circuit 301 receives the addresses, the graphic image data, and the selection information from an external MPU (or MCU), and transmits them respectively to the character display data RAM 303, the graphic image data RAM 309, and the property register 307. The character/graphic mixed display control circuit 311 receives font data from the character font ROM 305 and graphic image data from the graphic image data RAM 309, and selects and outputs final data to be displayed on an LCD, in response to the output of the property register 307. The common/segment LCD driver 313 generates a common signal level (COM) and a segment signal level (SEG) in response to the output of the character/graphic mixed display control circuit 311, to drive the LCD unit.

Figure 4:
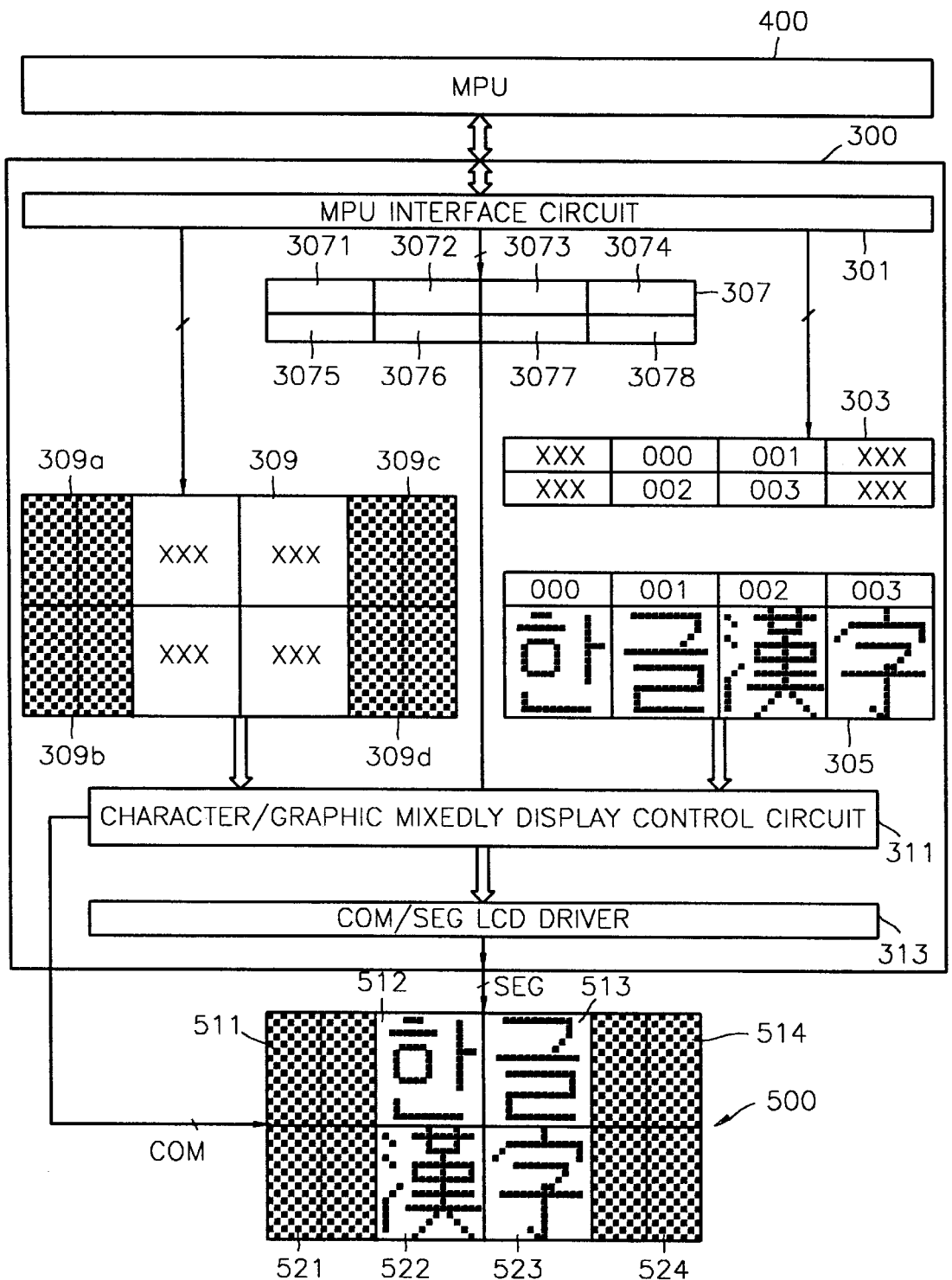
FIG. 4 is a flow diagram illustrating the operation of the graphic and character mixing circuit shown in FIG. 3 in accordance with the present invention.

FIG. 4 illustrates the operation of the integrated graphic and character mixing circuit of FIG. 3 for driving a display panel.

In a graphic and character combining circuit 300 according to the present invention, whether graphics or characters are displayed on an LCD panel 500 is determined according to the selection information stored in the property register 307. In particular, the number of selection bits in the property register 307 is determined according to the size of the font stored in the character font ROM 305, and the LCD panel 500 is divided into segments according to the maximum font size. For example, FIG. 4 illustrates that the font stored in the character font ROM 305 is of a size of 16×16 pixels at maximum. The LCD panel is thus divided into eight segments, or portions (511 through 514 and 521 through 524) of 16×16 pixels, and the number of bits of the property register 307 is set to eight, corresponding with the number of segments.

The property register 307 receives and stores selection information for each of the eight segments in the LCD panel 500 from an external MPU 400 via the MPU interface circuit 301. First through fourth bits 3071, 3072, 3073, 3074 of the property register 307 correspond to segments 511, 512, 513, 514 of the LCD panel 500, and fifth through eighth bits 3075, 3076, 3077, 3078 in the property register 307 correspond to segments 521, 522, 523, 524 of the LCD panel 500. When a bit value of the property register 307 is a particular value, for example "0", character data stored in the character font ROM 305 is displayed on the LCD panel 500. When a bit value of the property register 307 is an opposite value, for example "1", graphic image data stored in the graphic image data RAM 309 is displayed on the LCD panel 500. Accordingly, eight characters (four characters in each of two rows) of 16×16 pixels, eight graphic images of 16×16 pixels, or mixed characters and graphics may be displayed on the segmented LCD panel 500, according to the value of each bit of the property register 307.

The character font ROM 305 stores font data of complete characters, and the character display data RAM 303 stores addresses corresponding to the font data stored in the character font ROM 305. For the example given in FIG. 4, a Korean character is stored in addresses 000 and 001 of the character font ROM 305, a Chinese character is stored in addresses 002 and 003, and the addresses 000 through 003 of the character font ROM 305 are stored in the character display data RAM 303.

The graphic image data RAM 309 stores graphic image data corresponding to 32×64 graphic pixels of the segmented LCD panel 500. For example, in FIG. 4, graphic image data corresponding to graphic pixels of regions 511, 521, 514, and 524 among 8 segmented regions of the LCD panel 500 are stored in the graphic image data RAM 309 at locations 309a, 309b, 309c, and 309d respectively. Each pixel of the LCD panel 500 corresponding to each bit of the graphic image data RAM 309 is selectively activated and deactivated according to the value of data stored in each bit. For example, when the value of a bit of the graphic image data RAM 309 is "0", a pixel corresponding to this bit value is inactive. When the bit value is "1", a pixel corresponding to this bit value is active.

As shown in FIG. 4, when the first through fourth bits 3071, 3072, 3073, 3074 of the property register 307 are set to (1001) and the fifth through eighth bits 3075, 3076, 3077, 3078 are set to (1001), the character/graphic mixed display control circuit 311 selects and outputs the Korean characters stored in addresses 000 and 001 of the character font ROM 305, the Chinese characters stored in addresses 002 and 003, and graphic image data stored in the graphic image data RAM 309. Thus, the common/segment LCD driver 313 generates a common signal level (COM) and a segment signal level (SEG) in response to the output of the character/graphic mixed display control circuit 311. Therefore, the Korean characters are displayed on regions 512 and 513 of the LCD panel 500, the Chinese characters are displayed on regions 522 and 523 of the LCD panel 500, and graphic image data is displayed on regions 511, 514, 521 and 524 of the LCD panel 500.

Consequently, in the integrated graphic and character combining circuit for driving a display device according to the present invention, combined graphic images and characters can be displayed together, or individually, on a single LCD panel. Thus, various LCT screen configurations are possible. Furthermore, external ROM is not necessary, reducing system costs, and the level of burden imposed on the MPU is reduced, as compared to conventional architectures.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A circuit for driving a display device comprising:
   a character font memory for storing character font data;
   a character display data memory for storing addresses corresponding to the character font data stored in the character font memory;
   a graphic image data memory for storing graphic image data;
   a property register for storing selection data related to said character font data and said graphic image data, the property register including a number of memory locations, the number corresponding to the size of the font stored in the character font memory, and wherein the display device is segmented into segments according to the maximum size of the font; and
   a combined display control circuit for selecting combined display data to be displayed on the display device, in response to the selection data of the property register, from among received character font data from the character font memory and graphic image data from the graphic image data memory.

2. The circuit as claimed in claim 1, further comprising:
   an interface circuit for receiving and storing the addresses, the graphic image data and the selection data from an external processor respectively in the character display data memory, the graphic image data memory, and the property register; and
   a display device driver for generating control signals for driving the display device to display the combined display data.

3. The circuit as claimed in claim 2, wherein the display device driver generates common (COM) and segment (SEG) control signals for driving a liquid crystal display (LCD) device.

4. The circuit as claimed in claim 1, wherein each memory location of the property register stores selection information related to each segment of the segmented display device.

5. The circuit as claimed in claim 4, wherein when the value of a bit of the property register is a first binary value, a character stored in the character font memory is displayed on a corresponding segment of the display device, and when the value of a bit of the property register is a second binary value, graphic image data stored in the graphic image data memory is displayed on a corresponding segment of the display device.

6. The circuit as claimed in claim 1, wherein the display device comprises a liquid crystal display (LCD) panel.

7. The circuit as claimed in claim 1, wherein the character display data memory and graphic image data memory comprise random access memory (RAM).

8. The circuit as claimed in claim 1, wherein the character font memory comprises read only memory (ROM).

9. The circuit as claimed in claim 1, fabricated as an integrated circuit (IC).

* * * * *